United States Patent [19]

Coyne, Jr.

[11] Patent Number: 4,917,723
[45] Date of Patent: Apr. 17, 1990

[54] METHOD FOR AGGLOMERATION OF IRON BEARING MATERIALS

[75] Inventor: Thomas J. Coyne, Jr., Clover, S.C.
[73] Assignee: T.C., Inc., Clover, S.C.
[21] Appl. No.: 301,872
[22] Filed: Jan. 26, 1989
[51] Int. Cl.$^4$ ............................................... C22B 1/08
[52] U.S. Cl. ........................................ 75/433; 75/749; 75/961
[58] Field of Search ........................................ 75/3–5, 75/445, 25

[56] References Cited

U.S. PATENT DOCUMENTS

| | | | |
|---|---|---|---|
| 3,308,219 | 3/1967 | Schmalfeld | 75/4 |
| 3,577,912 | 5/1971 | Busi | 75/44 S |
| 3,589,276 | 6/1971 | Swallert | 75/44 S |
| 3,627,288 | 12/1971 | MacDonald | 75/44 S |
| 4,036,441 | 7/1977 | Basten | 75/44 S |

*Primary Examiner*—Peter D. Rosenberg

[57] ABSTRACT

A method for compaction of iron bearing materials includes the steps of accumulating iron and steel plant waste materials, including iron bearing fines, hazardous mill waste products, fines, turnings, borings, sludge, dust, mill scale, and the like; and agglomerating such materials by ram briquetting in a ram briquetter. In order to recover valuable non-ferrous constituent metals, the agglomerated material is charged to a smelter; the non-ferrous metals volatilized and removed with the smelter off-gases; the dust is recovered from the smelter off-gases; the recovered dust agglomerated by ram briquetting to form a cold compact material which is charged again into the smelter to volatilize the non-ferrous metals contained therein; the volatilized non-ferrous metal is again recovered as dust; the percentage of each non-ferrous metal in the recovered dust is determined; and when the percentage of dust is sufficiently high that at least one component is economically recoverable, the dust is removed from the process as a high value agglomerate for separate recovery of the non-ferrous metals contained therein.

5 Claims, 2 Drawing Sheets

METHOD FOR AGGLOMERATION OF IRON BEARING MATERIALS

BACKGROUND OF THE INVENTION

This invention relates to a method and apparatus for the agglomeration and compaction of iron bearing materials utilizing a continuous process employing ram compactors and known solids handling and mixing equipment. The method is particularly effective in compaction of steel plant waste materials and hazardous wastes.

This invention relates further to iron and steel making, wherein iron bearing materials are reduced of oxygen by chemical extraction or liberation with a media, and wherein the processing results in solid iron-bearing materials considered as wastes being ejected from the system and thereupon discarded. These materials are discarded since no commercial process is in operation that economically justifies their recovery.

Presently available commercial processes and equipment for compaction of steel plant wastes are not capable of providing a useful non-hazardous product without hot compaction. The method is also effective for the recovery and use of steel mill waste materials, reducing the environmental hazards associated therewith.

In some cases where economic considerations are justified, waste materials can be agglomerated into pellets for reintroduction to the feed system. In most other cases, waste materials are considered as loss materials and discarded. In direct reduction, wherein iron bearing material is reduced through chemical extraction of oxygen, the present state of the art dose not include any method of agglomeration of the product for economical handling and export.

Although great amounts of money have been spent on these developments, no commercial plants have been built for the recovery of steel plant waste or the economical production of agglomerated direct reduced iron. Thus, this invention applies to the economical recovery and use of iron and steel mill waste, the economical agglomeration of direct reduced iron, the production of other products using both the aforementioned materials and additives to produce feed materials for ferro alloy production, iron and steel mill charges, recovery of hazardous steel mill wastes, recovery of iron and steel mill wastes, and compaction to direct reduced iron.

In this invention, materials handling and mixing equipment known to the industry and known ram briquetting equipment collect, feed, mix, distribute and agglomerate iron bearing material. By the invented process, in-plant iron-bearing materials and wastes associated with iron and steel mills and associated with direct reduced iron materials are treated and handled. The compositions of materials are in the form and consist of iron ore fines and dust, direct reduced iron fines and dust, direct reduced iron, slurry sludge of iron bearing materials, mill scale, and other waste materials in iron and steel mills, such as lime dust and coal or coke dust as an additive or other additives such as silica, manganese, or any other materials and alloys and in combinations with the intent to make products and for the purpose of handling and treating in plant wastes. Manufacturing plants which utilize iron or iron-bearing materials, such as nail making plants, can also use the process for handling of turnings, borings, clippings, iron-bearing scrap, and other in-plant wastes. Further use of the invented process is to treat direct reduced iron, by cold compaction for the purpose of export of direct reduced iron products without additives in an economical manner conducive to presently operated direct reduced iron plants.

In recent years, many reduction plants normally associated with iron and steel mills have been installed worldwide. In most cases, the direct reduction plants have been designed with excess capacity, despite the state of iron and steel overcapacity in the world. Since the direct reduction of iron is a separate process for the extraction and purification of the iron, and the DRI product is to be used as feed stock for iron and steel processes, direct reduced iron is available in excess capacity from those installations. However, in order to take advantage of the excess capacity, the direct reduced iron product must be treated in a manner for shipping and storage that is convenient to use as feed stock. To be stored, one must consider the well known phenomenon of reoxidation (including catastrophic reoxidation) of direct reduced iron as well as consider environmental concerns of the generation of dust and fines. Processes have been developed and are in commercial operation for entire direct reduction plants, but there is no available means to handle excess production capacities due to economic constraints and high cost of capital investment.

Recently, the use of iron bearing materials in the form of fines, pellets and natural lump has generated a major impact on the economics of the facility by the accumulation of large amount of iron bearing wastes. No commercial process is in operation to handle or treat these wastes and plant-generated fines.

This invention is a process for the treatment, handling, and agglomeration of those iron and steel mill wastes, the agglomeration of excess direct reduced iron, the manufacturing of other products as feed source materials for the iron and steel mill industry, contained in a single process and equipment designed to be scaled down or up depending on the economic considerations of the plant and materials to be treated.

The process of this invention has great flexibility and may be used to mix and feed various materials to produce a product to the consistency of iron and steel mill requirements. The invented process allows the recovery of iron and steel mill in-plant wastes, treatment and agglomeration of direct reduced iron and production of feed materials for the ferro alloy industry, utilizing a single process which requires no additions for any product changes.

SUMMARY OF THE INVENTION

The present invention includes the agglomeration of iron bearing materials that may be in the form of iron oxide fines, dust, direct reduced iron, mill scale, slurry or sludge, dust collection materials, lime dust, carbon dust and fines additives, such as alloying agents in combinations with the intent to make products and for the purpose of treatment of the feed materials in a manner that is economically viable for the collection, agglomeration, and sale of the agglomerated products.

The materials to be agglomerated can be combined in a series of production units, designed for the specific sized installation, which results in a process which is economically viable for that installation.

In addition, direct reduced iron can be economically agglomerated by means of the present invention in a manner suitable and acceptable to shipping, handling and storage, and as a feed material suitable for iron and steel mill use.

Ram briquetters have been used for more than 50 years for the sole purpose of compacting turnings and borings, along with ground scrap, such as castings. In each case, the charge materials require special preparation and closley controlled percentages of components in the charge to the briquetter. Heretofore, those highly skilled in the ram briquetting art have state vociferously that applicant's iron-bearing wastes, including DRI, cannot successfully be ram briquetted. In the invented process, a known machine is used for compacting of in-plant waste, direct reduced iron, and other materials without requiring preparation, such as grinding, and generally without requiring binders.

Currently, there are restrictions on shipment of flue dust and other waste products because they are designated "hazardous material". This requires treatment to avoid the "hazardous material" designation. Electric arc furnace dust, which is a hazardous material, can be recovered and briquetted, then recycled to the electric arc furnace. Heavy metals will be volatilized and recovered through the dust collection system. The dust then again is recovered with additional buildup of heavy metals and recycled further through the electric arc furnace. When the heavy metal buildup is sufficiently high to be economically recovered, then it is removed from the system recovered separately.

A significant problem in hazardous dust storage is that it is subject to leaching by rain water and contaminating the ground on which it is stored, which problem is overcome by utilizing the invented process.

A DRI (direct reduced iron) product, which is normally designated "hazardous" is also made by this process, which product is suitable for shipment, including international shipment, or storage, without further processing.

'Prereduced iron with carbon and alloy additives are briquetted in a ram briquetter to provide a ferro-alloy product. Since it is standard to reduce a ferro-alloy after agglomeration, this additional reduction step is avoided.

One or more additives, such as alloy materials, lime, etc., can be included in the briquet, according to the choice of the operator.

One of the principal advantages of the invented ram briquetting process is that it allows the recovery of all in plant waste and removal of the hazardous waste as useful materials.

OBJECTS OF THE INVENTION

It is the principal objective of this invention to provide an economical means for recovery of iron and steel mill wastes for the reuse and/or sale of the product.

It is another objective of this invention to provide an economical means for treating direct reduced iron for safe handling, shipping and storage of the product.

It is also an objective of this invention to provide a means for producing a feed material for production of ferro alloys from direct reduced iron and alloying agents.

It is also an objective of this invention to provide means for recovery for storage of hazardous steel mill wastes.

DESCRIPTION OF THE DRAWINGS

The foregoing and other objects will become more readily apparent by referring to the following Detailed Description and the appended drawings, in which.

DETAILED DESCRIPTION

Figure 1:
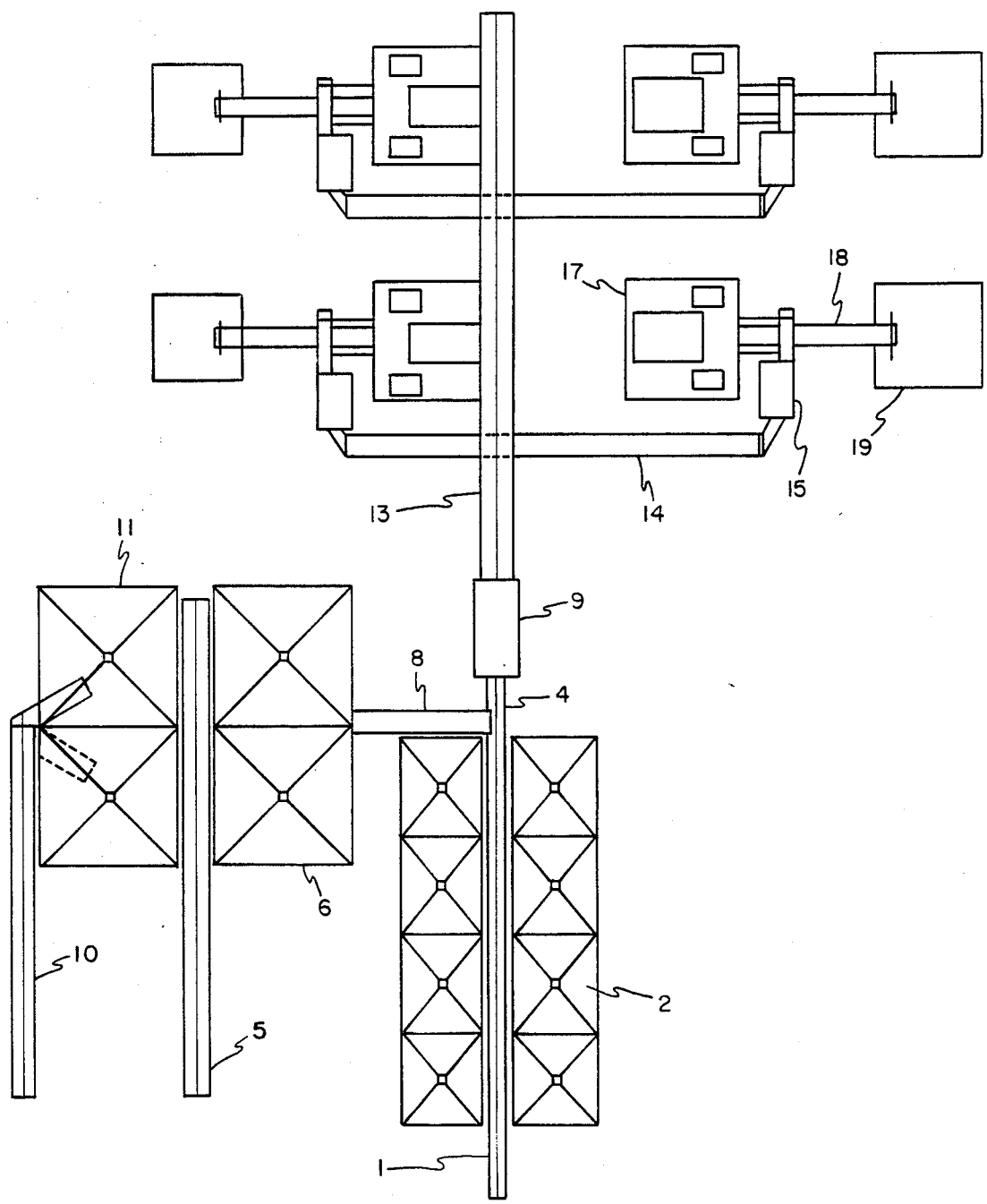
FIG. 1 is a plan view of a steel plant waste recovery system utilizing ram briquetting in accordance with the invention.

Referring now to FIG. 1, in-plant waste is accumulated in hoppers 2, 6, and 11. Conveyers 1, 5, and 8, associated with the hoppers, feed the material onto a common conveyor 1, thence into mixer 9, and then from mixer 9 onto conveyor 13, from which the material feeds cross conveyor 14, leading to secondary mixer 15 and the ram briquetting press 17. The briquets, or cold pressed agglomerates, fall onto conveyor 18 and are removed to storage areas or storage bins 19.

Bins 6 and 11 may be used to store desired alloying elements, direct reduced iron, or other material which is consumed in large quantities by the ram briquetter. Each mixer tends to homogenize the mass of material being charged thereto, and the more mixing that is done, the better is the quality of the finished briquet, which is a very dense, compact, and non-friable material.

By this process, waste materials from a steel plant are turned into useful, nonhazardous materials.

Suitable ram briquetters are the Lindermann Briquetting Press available from Lindermann Recycling Equipment, Inc., of N.Y., N.Y., or the ram briquetter of C-E Cast Equipment Division of Combustion Engineering, Inc., of Cleveland, Ohio.

Agglomerated in-plant waste from a steel mill is well suited for use as feed to a blast furnace or as coolant to a steelmaking process. Direct reduced iron in any form can be used as feed material to the ram briquetter in the invented process.

Figure 2:
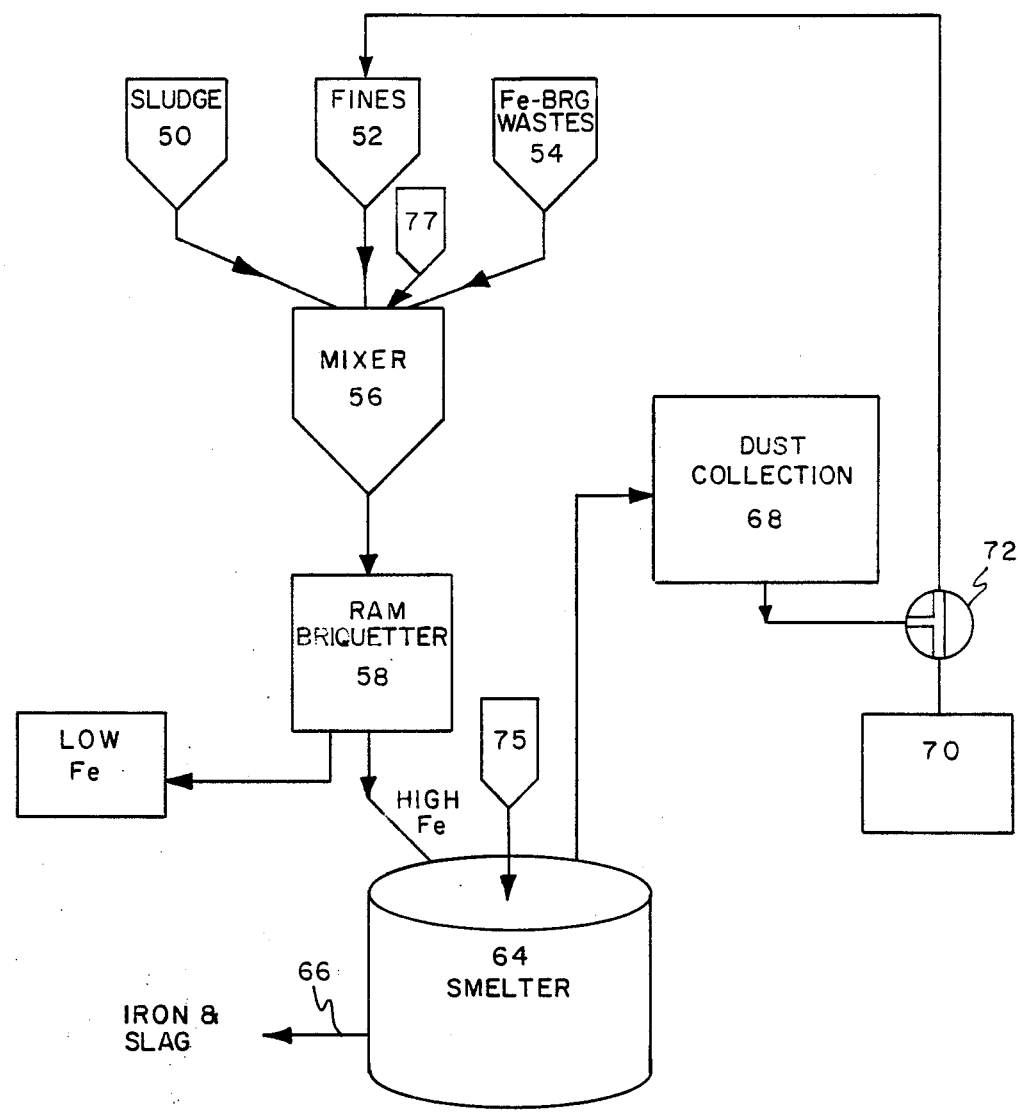
FIG. 2 is a schematic flow diagram of a method for recovering nonferrous metals from a steel plant waste in accordance with the present invention.

In a secondary recovery method associated with the process, a smelter is charged with briquets made as set forth above. The heavy metals are volatilized into the smelter off-gases, which are collected in a bag house, or a precipitator or any other suitable dust collection system. This dust is briquetted in accordance with the process set forth above and recycled to the smelter where the process is continued. The dust will have greater and greater concentrations of hazardous metals until the briquetted dust is no longer waste material, but becomes a valuable feed material for a recovery process to recover the valuable component. This is depicted in FIG. 2, in which iron bearing sludge is collected from the steel plant and accumulated in storage bin 50. Iron bearing fines are accumulated in storage bin 52 and other iron bearing wastes are accumulated in storage bin 54. Iron bearing material from the bins is delivered to mixer 56 wherein it is mixed to form a mass as homogenous as possible. The thoroughly mixed materials are then delivered to ram briquetter 58 wherein they are compacted by standard ram briquetting with or without the addition of heat to the charge materials, as desired. The briquettes may be separated, if desired, into low iron containing and high iron containing materials by any convenient means, including magnetic separation. The low iron materials may be removed from the process. Normally, however, all of the briquettes are charged into the smelter 64 and after the melting and refining process is performed, iron and slag are removed at slag notch 66. Dust and volatiles are removed from the top of the smelter to dust collector 68. The collected fines are analyzed for non-metallic content, and when the percentage of non-metallics is high enough, the recycling of fines is ceased, and the fines are passed to a storage bin 70, from which they may be briquetted or agglomerated in any manner desired. When the percentage of iron in the dust rises, the dust is again recycled though valve 72 to fines bin 52.

The process can also be used to make ferro alloys by selected feed of iron bearing materials and the proper alloying agents, such as lime, coal, coke, chromium, magnesium, silica, manganese, or other alloying materials, for the agglomerated ferro alloy. As shown in FIG. 2, the smelter 54 can be used to make ferro alloys by the addition of alloying agents such as lime, coal, coke, chromium, magnesium, silica, manganese, and other alloying materials, to the smelter from source 75. Alternatively, such alloying agents may be introduced either into the feed materials or mixer 56 from source 77 prior to charging them into the smelter 64, which will also produce ferro alloys.

From the foregoing, it is readily apparent that I have invented an economical means for recovery of iron and steel mill wastes for the reuse and/or sale of the product, an economical means for treating direct reduced iron for safe handling, shipping and storage of the product, a means for producing a feed material for production of ferro alloys from direct reduced iron and alloying agents, and means for recovery for storage of hazardous steel mill wastes, and means for making a dense, principally DRI-containing briquet.

What is claimed is:

1. A method for recovering non ferrous metals from steel plant waste comprising:
    agglomerating said steel plant waste;
    charging said agglomerated waste to a smelter;
    smelting said agglomerated waste to form molten iron and slag;
    volatilizing the non ferrous metals and removing said volatilized non-ferrous metals with the smelter off-gases;
    recovering the smelter dust from the off-gas;
    agglomerating the recovered dust by ram briquetting to form a cold compact material;
    charging said cold compact material into said smelter to volatilize the non-ferrous metals contained therein;
    recovering the volatilized non-ferrous metal;
    determining the percentage of each non-ferrous metal in the recovered dust; and
    when the percentage of dust is sufficiently high that the hazardous component is economically recoverable, the agglomerate said high value dust to a high value agglomerate and remove it from the process for separate recovery of the non-ferrous metals contained therein.

2. A method according to claim 1, further comprising removing the molten iron from the smelter.

3. A method according to claim 2 further comprising, prior to the agglomerating step, adding at least one component from the group comprising lime, coal, coke, chromium, magnesium, silica, manganese, and other alloying materials.

4. A method according to claim 2 further comprising, prior to the agglomerating step, adding direct reduced iron to the mixed materials.

5. A method for forming compacts of iron bearing materials, comprising:
    accumulating at least one iron and steel plant waste material selected from the group comprising, iron bearing fines, hazardous mill waste products, iron-bearing sludge, flue dust, mill scale, iron-bearing scrap, turnings, borings, and clippings;
    segregating said waste materials
    selecting at least one iron-bearing material as feed material for compaction;
    mixing the feed material to achieve a uniform distribution thereof; and
    agglomerating the mixed material by ram briquetting in a ram briquetter.

* * * * *